(No Model.)
J. B. HAMMOND.
TYPE WRITING MACHINE.
No. 501,504. Patented July 18, 1893.
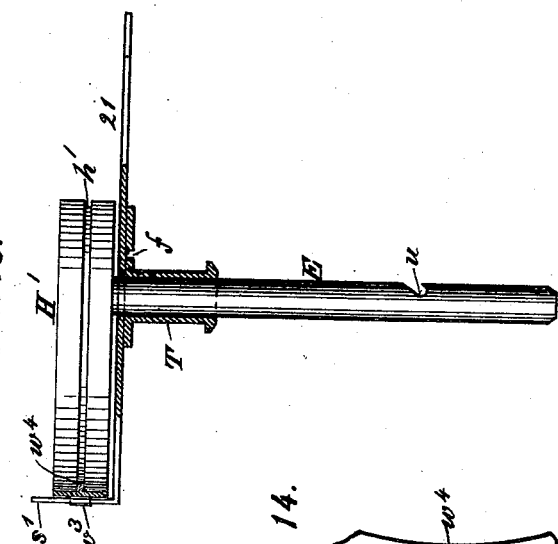
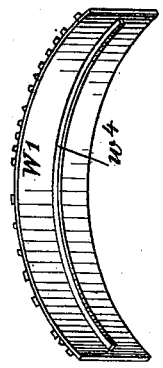
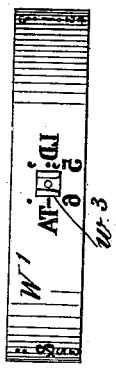
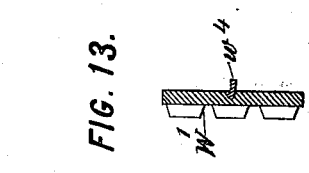
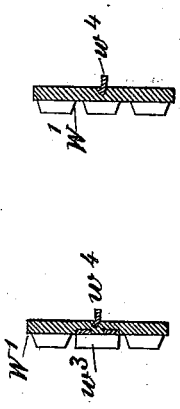
Witnesses:
John Becker
Louis E. Salmon.
Inventor:
James B. Hammond
by his attorney
Herbert W. Grindat (No Model.) 4 Sheets—Sheet 4.

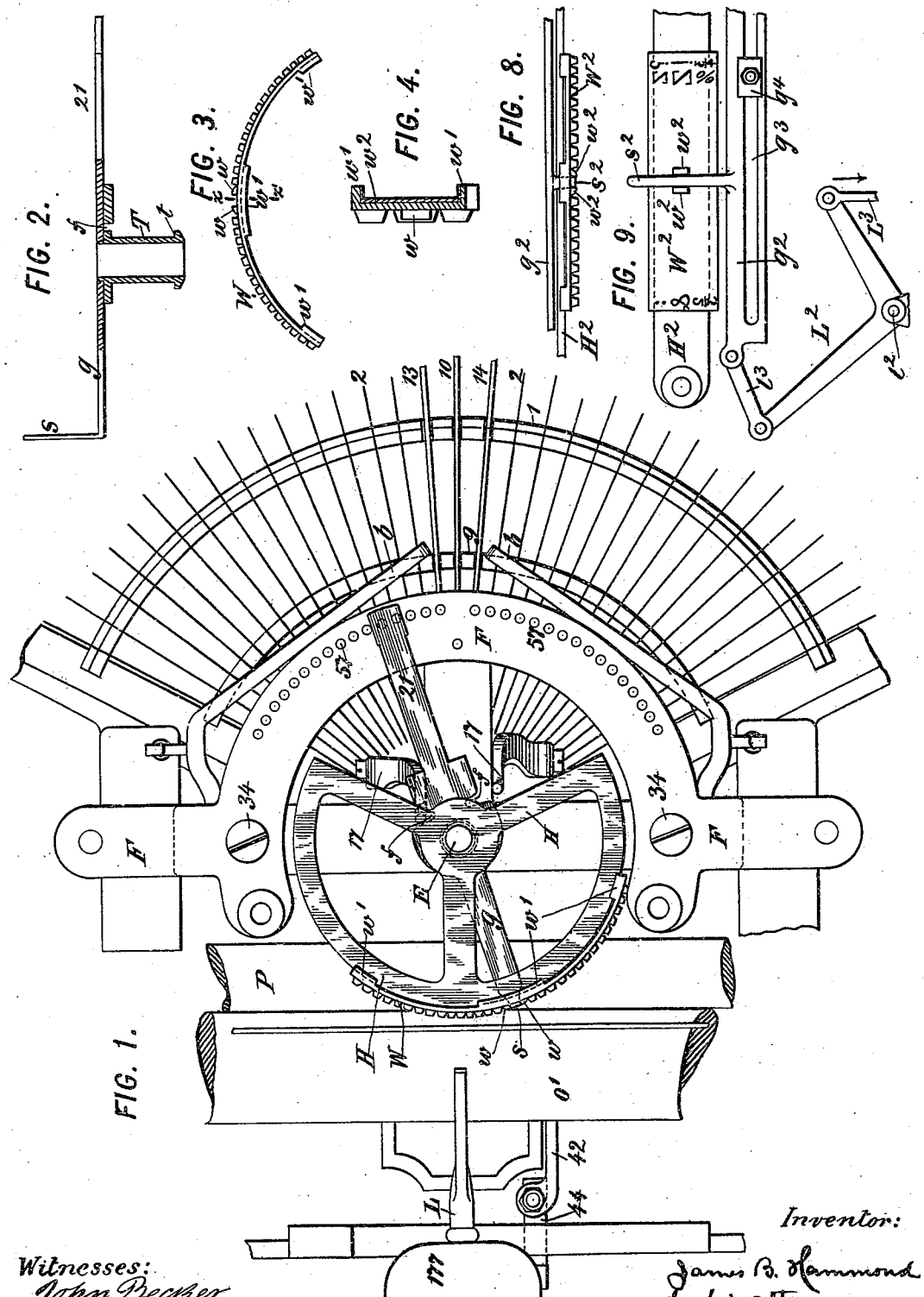

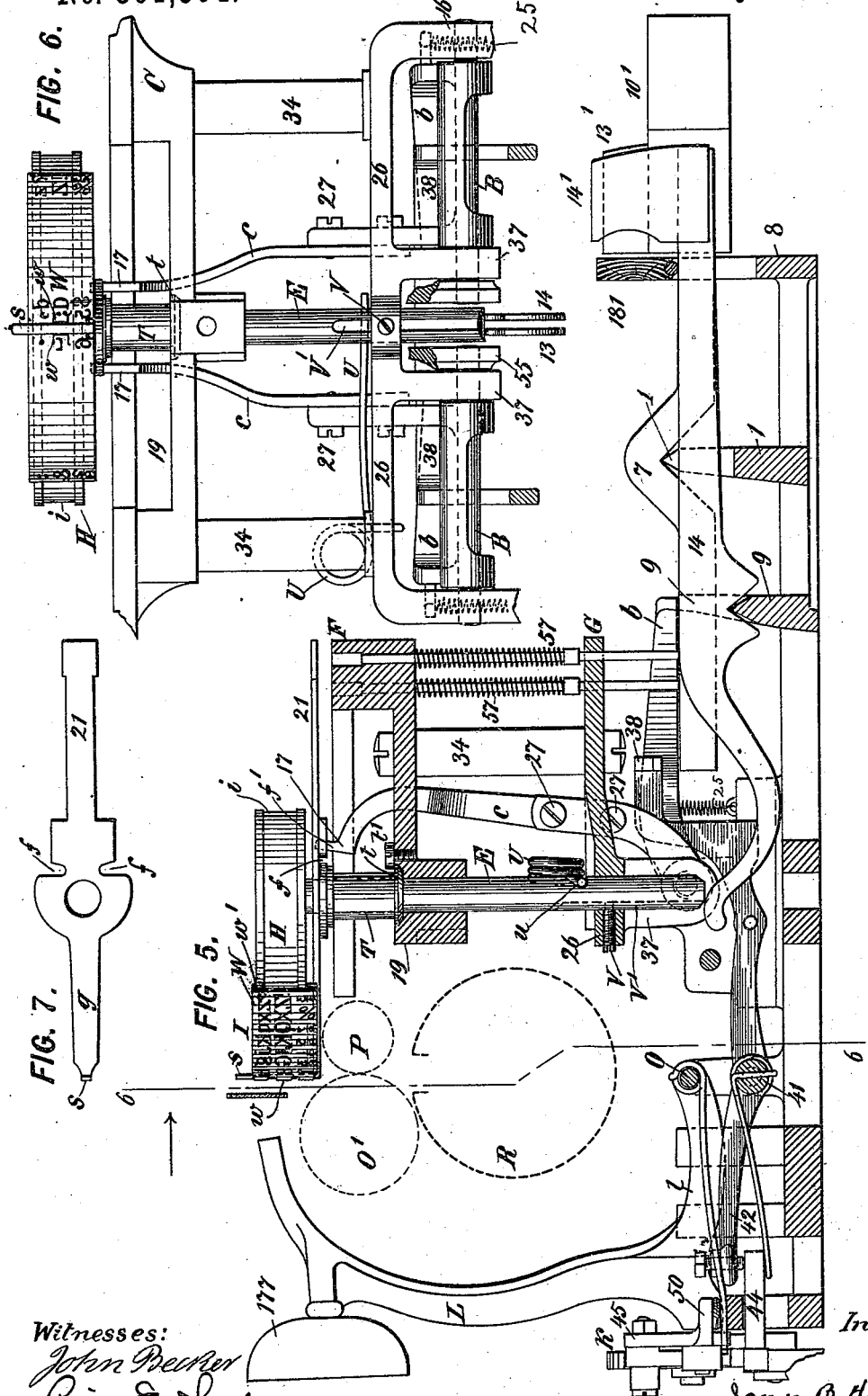

J. B. HAMMOND.
TYPE WRITING MACHINE.

No. 501,504. Patented July 18, 1893.

Witnesses
John Becker
Louis E. Palmer.

Inventor:
James B. Hammond
by his attorney
Herbert W. Grindal

UNITED STATES PATENT OFFICE.

JAMES B. HAMMOND, OF NEW YORK, N. Y.

TYPE-WRITING MACHINE.

SPECIFICATION forming part of Letters Patent No. 501,504, dated July 18, 1893.

Application filed October 5, 1892. Serial No. 447,919. (No model.)

*To all whom it may concern:*

Be it known that I, JAMES B. HAMMOND, a citizen of the United States, residing at the city and county of New York, State of New York, have invented a new and useful Improvement in Type-Writing Machines, of which the following is a full and exact specification, reference being had to the accompanying drawings.

My invention relates to that class of machines for which several Letters Patent have heretofore been issued to me, of which Nos. 253,475, 290,419 and 290,420 may be mentioned. In the construction of such machines it is desirable to reduce the weight of the type-carrying device to the lowest practicable point and to lighten the propelling force for the same, minimizing the inertia, and increasing the accuracy and precision of motion: and also at the same time to increase the strength and stability of the device which is opposed to the blows of the impression hammer.

In my former devices it was necessary to remove as much material as possible from the type segment, which removal necessarily had a tendency to lessen the stability of the segment when opposed to the hammer. But by my present invention the weight of the type-carrying device is reduced to a minimum and the inertia becomes an inconsiderable element in the operation of the machine. The slight rebound that with the type segment referred to in my previous patents might with an unskilled operator cause what is known as a split letter, is impossible in the operation of my present device, as its motion is absolute. But while thus lightening the type carrying mechanism so successfully, I have also increased the stability of the resistance to the impression hammer.

As shown in this application there is practically no limit to the strength which may be given the construction of the anvil which provides the necessary resistance to the hammer. It may oppose a solid block of steel to the blows if desired, and thus permit the hammer actuating spring to be of any strength desired.

Other advantages and possibilities of my invention are detailed in my specification.

Figure 17:
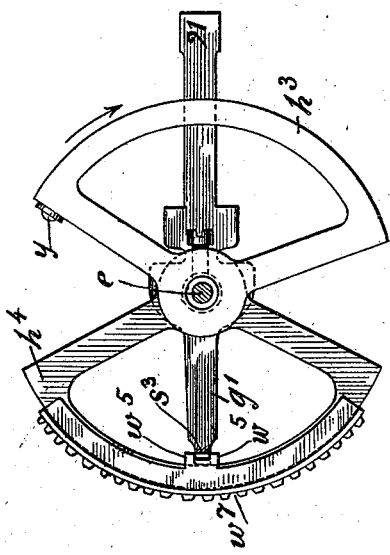
Figure 18:
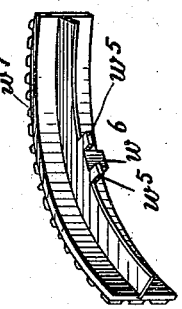
Figure 16:
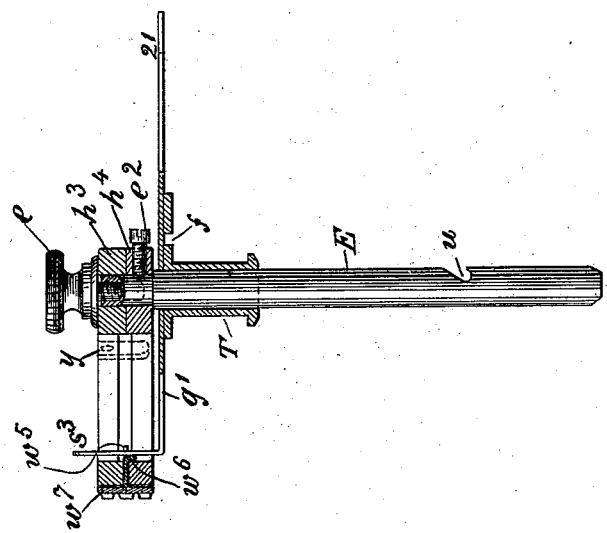

Referring to the drawings, Figure 1 is a plan view of my invention. Fig. 2 is a longitudinal section of the combined shuttle arm and stop arm. Fig. 3 is a top view of my new type shuttle and Fig. 4 an enlarged cross section of the same on the line $x$—$x'$ of Fig. 3. Fig. 5 is a vertical transverse section of a machine with my invention attached. Fig. 6 is a vertical longitudinal section of the same on the line 6—6 of Fig. 5. Fig. 7 is a plan view of the combined shuttle and stop arm. Figs. 8 and 9 are respectively top and front views of a modified form of shuttle sometimes used by me, and Figs. 10 and 11 are respectively inner and face views of another modification. Figs. 12 and 13 show enlarged vertical cross sections of the shuttle shown in Figs. 10 and 11 taken at the center and at one side of the center. Fig. 14 is an enlarged longitudinal section of a portion of such a shuttle, and Fig. 15 shows a cross section of such shuttle and its carrier in position upon the modified form of anvil used for its support. Fig. 16 is a cross section of a modified form of anvil and type shuttle with the shuttle arm as adapted to it. Fig. 17 shows this anvil with its upper and lower sections separated, and Fig. 18 is an inner view of the type shuttle as adapted to this form of anvil.

F is the upper and G the lower supporting plate rigidly connected by the post 34, and supported upon a suitable bed plate which also serves to support the key-levers, the levers for raising the central anvil, the hammer arm and its operating springs, &c. The key levers, as 2, are supported on three concentric ribs of which the shaft E is the center. These levers are all of the same size and shape, and formed with an angular notch, 7. At this edge they are fulcrumed on the knife edge rib, 1. These levers act upon the stop pins 57, which in turn, being raised, arrest the stop arm 21. The levers 13 and 14 which are used to elevate the type anvil are fulcrumed on the rib 9, their rear ends resting below the shaft E. The combined shuttle arm $g$ and stop arm 21 is rigidly mounted upon the cylindrical sleeve T which is adapted to fit on the shaft E. The screw $t'$, in the plate F through which the shaft passes, secures the combined arm so that it cannot be raised, but permits its rotary motion. The finger S at the end of the shuttle arm $g$ is at a right angle with the arm and is of a width to fit into the space between the bosses $w-w$ on the type shuttle. At $f$, near the pivotal point, the arm is adapted to receive the end of the driving levers $c\,c$. These levers $c\,c$ are mounted on skeleton sleeves on the shafts B B. Secured to these shafts are the horizontal driver arms $b\,b$ which extend over the key levers 2. Springs, as 25, secured to these arms return them and the driving levers to their normal position. Each vertical driving lever terminates in a finger $f'$ which engages the combined shuttle and stop arm at $f$.

The anvil which supports the type shuttle is composed of the circular segment H which is rigidly mounted upon the shaft E. This segment H is so constructed that it affords a solid and rigid backing for the shuttle on its face. The face of the anvil is recessed at $i$ to lessen the bearing surface.

The shaft E has its lower end beveled and is provided with a groove $V'$ into which the screw V extends. By the action of screw V the shaft has a free vertical motion but cannot be revolved. The spring U resting in the notch $u$, serves to retract the shaft and anvil to their normal position after having been elevated by the lever 13 or 14.

The type shuttle W is usually made of hard rubber, but may be of any suitable material. I make it in several forms.

In the forms as shown in Figs. 3, 4, 5, and 6 it consists of a curved strip having on its face the letters or characters to be printed and provided on the back with clips $w'$ which engage the anvil H at its circumference. The finger S of the shuttle arm engaging the bosses $w$ on the front of the shuttle serves to retain it in contact with the anvil. In order to reduce the friction to its minimum, I spring the shuttle so that it comes in contact with the anvil only at its extremities. This difference in circumference is, however, very slight, and when the finger S engages the shuttle it is hardly appreciable to the unassisted eye. In the forms as shown in Figs. 10 to 14 inclusive, the shuttle is provided at its back with a metal rib, $w^4$, which is inserted in the rubber $w'$ so as to be firmly united with it. The inner edge of this rib is slightly bent or crimped so as to increase the firmness of its position in the rubber. On the face at the point of contact with the shuttle arm finger S is a piece of metal $w^3$, to serve as a bearing, to lessen the wear at that point. The segment H' of the anvil is necessarily modified to adapt it to the form of shuttle. The modification is confined to the face of the segment which is provided with the slot $h'$ adapted to receive the rib $w^4$.

In Fig. 16, $h^4$ is the lower and $h^3$ the upper half of the modified type anvil. The lower section is firmly fastened to the shaft E by the set screw $e^2$; the upper section fits loosely upon the shaft and is held in position by the thumb screw $e$. The stop $y$ secures correct registration between the two sections. The finger $S^3$ is on the shortened shuttle arm $g'$ and engages the type shuttle on its inner side by the projections $w^5$. This type shuttle is constructed like that shown in Fig. 10 except that the metal rib $w^4$ has the projection $w^5$ at the center and the retaining clip $w^6$ which is formed by turning down the metal which is struck out from between the projections $w^5-w^5$. A further modification is shown in Figs. 8 and 9 where the shuttle is made in the form of a flat plate and is operated by the lever arms $L^2$, $L^3$, which cause the shuttle carrier $g^2$ to reciprocate upon the bearing $g^4$ in the slot $g^3$ and to actuate the shuttle finger $S^2$.

O' and P are the two feed rolls which hold the paper to be printed upon; L is the impression hammer which is actuated through a spring mechanism operated by the key levers, as fully described in my previous patents.

The drawings do not show the entire mechanism of a type-writer but only so much as is necessary for the full understanding of my invention. And none of the mechanism shown in my previous patents is claimed in this application.

The operation of my invention is simple. The depression of a given key lever causes one of the horizontal driving arms $b$, $b$, to be raised and consequently the vertical driving lever $c$ is oscillated, rotating the shuttle arm $g$ and carrying the type shuttle to the right or left of its normal point. The characters upon the shuttle are arranged in such order that when the letter indicated by the key-lever operated upon is opposite the impression hammer L, the stop arm 21 comes in contact with the stop pin which has been raised by the same lever. The hammer actuating mechanism simultaneously causes the hammer to strike and the contact is made between the character and the paper. As soon as the pressure is removed from the key lever, the spring 25, draws down the horizontal driving arms to their normal position, thereby restoring the shuttle arm to its center point. The elevation of the anvil, carrying with it the type shuttle, is accomplished by the positive action of the levers 13 and 14, which act upon the shaft E. The return is caused by gravity assisted by the spring U. It will be noticed that when the shaft and anvil are elevated the shuttle arm remains in the same position, the screw $t'$ acting upon the flange $t$ to retain it. But the length of the finger S is sufficient to permit it to act upon the shuttle even when raised to its highest point. It is obvious that the number of rows of characters upon the type shuttle is variable at pleasure. If there be only one the levers 13 and 14 may be dispensed with, and if there be more than three there must be a corresponding increase in the number of elevating levers. The type shuttle shown in Figs. 10 to 15 may be easily removed by turning it around to the side of the anvil and slipping it out from under the finger S. and that shown in Figs. 16 to 18 by turning the upper half $h^3$ to one side. Any other shuttle bearing other characters may be then substituted.

Having thus set forth my invention, what I claim as new, and desire to secure by Letters Patent of the United States, is—

1. A detachable, segmental type shuttle bearing upon its face letters or characters and provided with a strengthening and supporting device substantially as described.

2. The combination of a shuttle, an independent shuttle and stop arm pivoted upon a center common with the type shuttle, and a key actuated driving lever imparting motion to said arm, substantially as described.

3. The combination of a type shuttle, an independent shuttle and stop arm and a key actuated driving lever imparting motion to said arm, substantially as described.

4. The combination of a shuttle, a pivoted shuttle arm and a lever actuated by a key lever whereby motion is imparted to said arm, substantially as described.

5. The combination of a shuttle arm provided with means for engaging the shuttle, a cylindrical sleeve rigidly united to said arm and adapted to fit upon a supporting shaft and a key operated driving lever for actuating said arm, substantially as described.

6. A shuttle arm provided with means for engaging a type shuttle at one end and adapted at its other end to engage a stop pin, substantially as described.

7. The combination of a type anvil consisting of a circular segment rigidly mounted upon a shaft and suitable levers for shifting the same, substantially as described.

8. The combination of a type shuttle and a supporting anvil substantially as described.

9. The combination of a type shuttle and a movable supporting anvil substantially as described.

10. The combination of a type shuttle and an anvil having a sliding connection therewith substantially as described.

11. The combination with a type shuttle of an anvil and means for preventing a rotary motion while permitting the vertical movement of the same, substantially as described.

12. The combination with a type shuttle having a metal rib of an anvil provided with means for supporting such shuttle and permitting its reciprocation thereupon, substantially as described.

13. The combination of a type shuttle, a supporting anvil and means whereby the same may be raised and lowered, substantially as described.

14. The combination of a type shuttle, a supporting anvil and an independent shuttle arm adapted to actuate said shuttle, substantially as described.

15. The combination of a type shuttle, a supporting anvil, an independent shuttle arm with means for actuating said shuttle arm, substantially as described.

16. The combination of a type shuttle, a supporting anvil, an independent shuttle arm and a driving lever or levers adapted to actuate said shuttle arm, substantially as described.

17. The combination of a type shuttle, a supporting anvil, an independent shuttle arm, a stop arm and a series of stop pins substantially as described.

18. The combination of a type shuttle, a supporting anvil, an independent shuttle arm, a stop arm, a series of stop pins and means to actuate said shuttle and stop arm and stop pins, substantially as described.

19. The combination of a segmental type shuttle removably supported upon an anvil, suitable key levers, a propelling mechanism between said shuttle and key levers and adapted to be actuated by said levers, substantially as described.

20. The combination of a type shuttle, suitable key levers, a propelling mechanism between said shuttle, and key levers adapted to be actuated by said levers, and a stop mechanism, substantially as described.

21. A shuttle arm having a finger at one end and being rigidly united with a cylindrical sleeve adapted to fit upon a supporting shaft, substantially as described.

22. A shuttle arm provided with means for engaging a type shuttle and with a stop arm adapted to strike against an index pin raised by a key-lever also adapted to actuate said shuttle arm through intermediate mechanism, substantially as described.

23. A type anvil consisting of a lower section rigidly mounted upon a supporting shaft, and an upper section mounted upon said shaft so as to be capable of being rotated thereupon, substantially as described.

24. A type anvil consisting of a lower section permanently fastened upon a supporting shaft and having an upper removable section adapted to be secured to said shaft by suitable means, substantially as described.

25. The combination with a type anvil having upper and lower sections of a type shuttle adapted to project within said sections and adapted to receive an actuating device reciprocated within said anvil, substantially as described.

26. The combination with a double type anvil of a type shuttle provided with a rib on its inner side and having means to engage a shuttle finger adapted to be actuated within the circumference of the said anvil, substantially as described.

27. The combination of a type anvil having upper and lower sections, a type shuttle supported thereupon between the same, and a type finger mounted upon a shuttle arm and adapted to engage said type shuttle, substantially as described.

28. The combination with a type shuttle supported between the sections of a double type anvil of a shuttle finger adapted to engage said shuttle, a shuttle arm supporting said shuttle finger and mechanism adapted to operate the same, substantially as described.

29. The combination of a type shuttle, a supporting anvil, a shuttle arm adapted to reciprocate said shuttle, a driving lever and means for actuating the same, substantially as described.

30. The combination of a type shuttle, suitable key-levers, and a propelling mechanism between said shuttle and key levers, substantially as described.

31. The combination of a type shuttle, suitable key levers, a propelling mechanism between said shuttle and key levers, and a stop mechanism, substantially as described.

32. The combination with a series of finger key levers, each of which operates to actuate the type shuttle of a type shuttle, a supporting anvil, mechanism between the finger key levers and type shuttle whereby motion imparted to the key levers is transmitted to the type shuttle, and means for retaining the type shuttle in the desired position, substantially as described.

33. In a type writing machine the combination with a type shuttle adapted to reciprocate in either direction from a normal position through a series of characters to present any desired letter at a given point, of an anvil upon which said shuttle reciprocates, finger key levers by which the operating power is supplied, intermediate mechanism, between said key lever and the shuttle, by which motion is imparted to said shuttle, and a stop mechanism operated by the key levers and acting to arrest said shuttle at the proper point, all substantially as described.

34. The combination of a type shuttle adapted to be reciprocated in either direction from a normal point through a series of characters to bring any one of said characters to said point, key levers to produce said motion and intermediate mechanism whereby said right and left hand motion is communicated to said shuttle, and a stop mechanism set in motion by said key levers and adapted to arrest said shuttle at a series of points on the right or left of said normal point, all substantially as described.

35. In a type writing machine the combination of the type shuttle, the anvil upon which the same is reciprocated, the independent shuttle arm adapted to actuate the shuttle, the driving lever arranged to rotate the shuttle arm and suitable devices whereby motion may be imparted to said driving lever through a finger key lever, all substantially as described.

36. In a type writing machine the combination of the reciprocating type shuttle, the shuttle arm actuating the same, the supporting type anvil, the stop pins acting against the stop arm to arrest the motion thereof, key levers adapted to raise said stop pin and driving levers adapted to be operated by said key levers, and to engage and operate said shuttle and stop arm, substantially as described.

JAS. B. HAMMOND.

Witnesses:
LOUIS E. SALMON,
WALTER L. WARDLE.